US012585444B2

(12) United States Patent
Park et al.

(10) Patent No.: US 12,585,444 B2
(45) Date of Patent: Mar. 24, 2026

(54) PROGRAM CONVERSION APPARATUS AND METHOD TO CONVERT PROGRAM INTO A HOMOMORPHIC ENCRYPTION PROGRAM

(71) Applicant: Electronics and Telecommunications Research Institute, Daejeon (KR)

(72) Inventors: Seong Cheon Park, Daejeon (KR); Hyun Woo Kim, Daejeon (KR); Su Yeon Jang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 251 days.

(21) Appl. No.: 18/505,799

(22) Filed: Nov. 9, 2023

(65) Prior Publication Data

US 2024/0160423 A1     May 16, 2024

(30) Foreign Application Priority Data

Nov. 11, 2022     (KR) ........................ 10-2022-0150528
Sep. 27, 2023     (KR) ........................ 10-2023-0130610

(51) Int. Cl.
*G06F 8/54*          (2018.01)

(52) U.S. Cl.
CPC ..................................... *G06F 8/54* (2013.01)

(58) Field of Classification Search
CPC ........................................................ G06F 8/54
USPC ................................................. 717/136–150
See application file for complete search history.

(56) References Cited

U.S. PATENT DOCUMENTS

| | | | |
|---|---|---|---|
| 9,331,851 B2 | 5/2016 | Youn et al. | |
| 9,946,810 B1 * | 4/2018 | Trepetin | G06F 7/00 |
| 10,270,588 B2 | 4/2019 | Youn et al. | |
| 10,541,805 B2 * | 1/2020 | Laine | H04L 9/008 |
| 10,546,141 B2 * | 1/2020 | Miguel | H04L 9/0861 |
| 10,749,665 B2 * | 8/2020 | Laine | H04L 9/008 |
| 10,778,408 B1 * | 9/2020 | Khedr | H04L 9/008 |
| 10,924,262 B2 * | 2/2021 | Shim | G06F 9/4401 |

(Continued)

FOREIGN PATENT DOCUMENTS

| | | |
|---|---|---|
| KR | 10-2020-0054119 | 5/2020 |
| KR | 10-2022-0068006 | 5/2022 |

OTHER PUBLICATIONS

Acar et al, "A Survey on Homomorphic Encryption Schemes: Theory and Implementation", ACM, pp. 1-35 (Year: 2018).*

(Continued)

*Primary Examiner* — Anil Khatri
(74) *Attorney, Agent, or Firm* — KILE PARK REED & HOUTTEMAN PLLC

(57)          ABSTRACT

A program conversion apparatus converts a first program to which homomorphic encryption is not applied into a second program to which the homomorphic encryption is applied. The program conversion apparatus may include a memory, which stores a first library for configuring the first program and a second library for configuring the second program. The program conversion apparatus may include a processor, which converts the first program into the second program through conversion between operations provided by the first and second libraries. A program conversion method and a computer program recorded on a computer-readable storage medium are also disclosed.

11 Claims, 4 Drawing Sheets

(56) References Cited

U.S. PATENT DOCUMENTS

| 10,972,251 B2 * | 4/2021 | Carr | .................... H04L 63/0442 |
| 11,277,256 B2 * | 3/2022 | Kim | ........................ H04L 9/008 |
| 11,323,241 B2 * | 5/2022 | Hoshizuki | .............. H04L 9/008 |
| 11,405,176 B2 * | 8/2022 | Ghosh | ...................... G06N 3/08 |
| 11,562,382 B2 * | 1/2023 | Cotton | .............. G06Q 30/0202 |
| 2019/0260585 A1 * | 8/2019 | Kawai | .................. H04L 9/0825 |

OTHER PUBLICATIONS

Mahmood et al, "New Fully Homomorphic Encryption Scheme Based on Multistage Partial Homomorphic Encryption Applied In Cloud Computing", IEEE, pp. 1-5 (Year: 2018).*
Archer at al, "Ramparts: A Programmer-Friendly System for Building Homomorphic Encryption Applications", ACM, pp. 1-13 (Year: 2019).*
Crockett et al, "Alchemy: A Language and Compiler for Homomorphic Encryption Made easY", ACM, pp. 1-19 (Year: 2018).*
Nozaki et al "MLIR-Based Homomorphic Encryption Compiler for GPU", CM, pp. 1-4 (Year: 2024).*
Chatel et al, "VERITAS: Plaintext Encoders for Practical Verifiable Homomorphic Encryption", ACM, pp. 1-16 (Year: 2024).*

* cited by examiner

FIG. 3

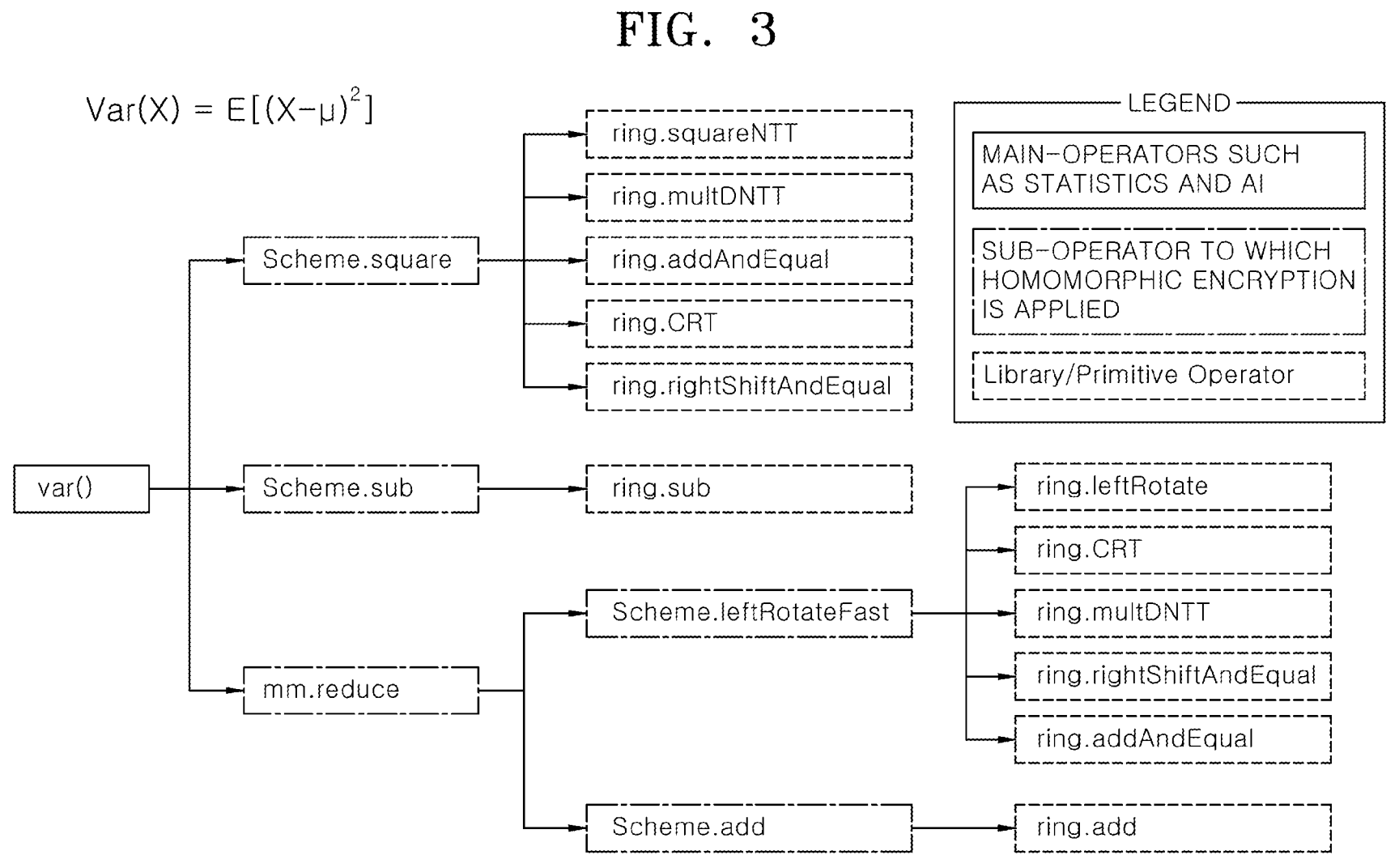

$$Var(X) = E[(X-\mu)^2]$$

LEGEND

MAIN-OPERATORS SUCH AS STATISTICS AND AI

SUB-OPERATOR TO WHICH HOMOMORPHIC ENCRYPTION IS APPLIED

Library/Primitive Operator var()

Scheme.square

Scheme.sub mm.reduce ring.squareNTT ring.multDNTT ring.addAndEqual ring.CRT ring.rightShiftAndEqual ring.sub Scheme.leftRotateFast Scheme.add ring.leftRotate ring.CRT ring.multDNTT ring.rightShiftAndEqual ring.addAndEqual ring.add

1

PROGRAM CONVERSION APPARATUS AND METHOD TO CONVERT PROGRAM INTO A HOMOMORPHIC ENCRYPTION PROGRAM

CROSS-REFERENCE TO RELATED APPLICATIONS

This application claims priority to and the benefit of Korean Patent Application Nos. 10-2022-0150528 and 10-2023-0130610, filed on Nov. 11, 2022 and Sep. 27, 2023, respectively, the disclosure of which is incorporated herein by reference in its entirety.

BACKGROUND

1. Field of the Invention

The present invention relates to program conversion apparatus and method, and more particularly, to an apparatus and a method for converting a general program into a homomorphic encryption program.

2. Discussion of Related Art

Homomorphic encryption is a technology that enables operations using ciphertext and in which a result of an operation using plaintext and a result of an operation and decryption using ciphertext have the same value. Using these features, it is possible to perform statistical processing and machine learning on personal information in an encrypted state without decrypting encrypted data. Since operations such as statistical processing, search, and machine learning are possible in an encrypted state, even when a hacker hacks data, only encrypted data is stolen and the original data cannot be interpreted. Due to the excellent security of homomorphic encryption, the application of homomorphic encryption is increasing in medical and financial fields.

Meanwhile, when a general programmer implements a program to which homomorphic encryption is applied (hereinafter referred to as a homomorphic encryption program), a common method is to implement the homomorphic encryption program by understanding a homomorphic encryption operation algorithm and then reflecting the homomorphic encryption in a program. However, homomorphic encryption technology is a highly difficult technical field that requires deep knowledge of cryptography, and there is a limit to the ability of general programmers to completely understand homomorphic encryption operation algorithms so that there is a problem of degrading the accuracy and performance of the homomorphic encryption program. There are homomorphic encryption for arithmetic of approximate numbers (HEAAN), simple encrypted arithmetic library (SEAL), PALISADE, and the like that have been released by implementing homomorphic encryption operation algorithms as software libraries. However, when a homomorphic encryption program is implemented using such a library, an understanding of the homomorphic encryption operation algorithm applied to the library should be established first, so that there are limitations in general programmers implementing homomorphic encryption programs.

The related art of the present invention is disclosed in Korean Patent Laid-Open Application No. 10-2020-0054119 (published on May 19, 2020).

SUMMARY OF THE INVENTION

The present invention is directed to providing program conversion apparatus and method that can implement a homomorphic encryption program to which homomorphic encryption is applied by implementing only a general program to which homomorphic encryption is not applied, when the homomorphic encryption program is implemented, without understanding a homomorphic encryption operation algorithm.

According to an aspect of the present invention, there is provided a program conversion apparatus, which converts a first program to which homomorphic encryption is not applied into a second program to which the homomorphic encryption is applied, including a memory, which stores a first library for configuring the first program and a second library for configuring the second program, and a processor configured to convert the first program into the second program through conversion between operations provided by the first and second libraries.

One or more general operations to which homomorphic encryption is not applied may be defined in the first library, and one or more homomorphic encryption operations to which homomorphic encryption is applied may be defined in the second library.

The processor may convert the first program into the second program through conversion from the one or more general operations provided by the first library into the one or more homomorphic encryption operations provided by the second library.

The processor may convert the first program into the second program by identifying a first operation applied to the first program among the one or more general operations provided by the first library and calling a second operation corresponding to the identified first operation among the one or more homomorphic encryption operations provided by the second library.

Among the general operations of the first program, an operation, which is required to be converted into the second operation, may be tagged with a decorator, and the processor may specify the operation tagged with the decorator among the general operations of the first program as the first operation.

The one or more general operations defined in the first library and the one or more homomorphic encryption operations defined in the second library may have a linked relationship according to a type of operation.

The processor may convert the first program into the second program by calling the second operation linked to the first operation based on the linked relationship.

The processor may convert the first program into the second program by performing a process of calling the second operation linked to the first operation for each operation applied to the first program.

According to another aspect of the present invention, there is provided a program conversion method, which converts a first program to which homomorphic encryption is not applied into a second program to which the homomorphic encryption is applied, including receiving, by a processor, the first program, and converting, by the processor, the first program into the second program through conversion between operations provided by first and second libraries, wherein the first and second libraries are libraries for configuring the first and second programs, respectively.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 3 is an exemplary diagram illustrating a structure of a variance operation algorithm of a second library in the program conversion apparatus according to the present embodiment.

DETAILED DESCRIPTION OF EXEMPLARY EMBODIMENTS

Figure 1:
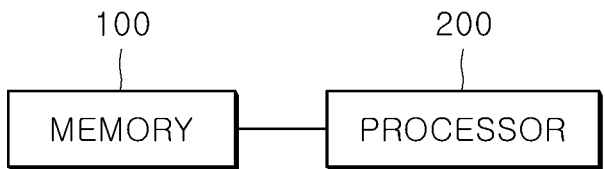
FIG. 1 is a block diagram illustrating a program conversion apparatus according to the present embodiment.

Hereinafter, exemplary embodiments of program conversion apparatus and method according to the present invention will be described with reference to the accompanying drawings. Here, thicknesses of lines, sizes of constituent elements, or the like illustrated in the drawings, may be exaggerated for clarity and convenience of description. In addition, the terms described below are defined in consideration of the functions of the present invention, and these terms may vary according to the intent or custom of a user or an operator. Therefore, these terms should be defined on the basis of the content throughout the present specification.

Figure 2:
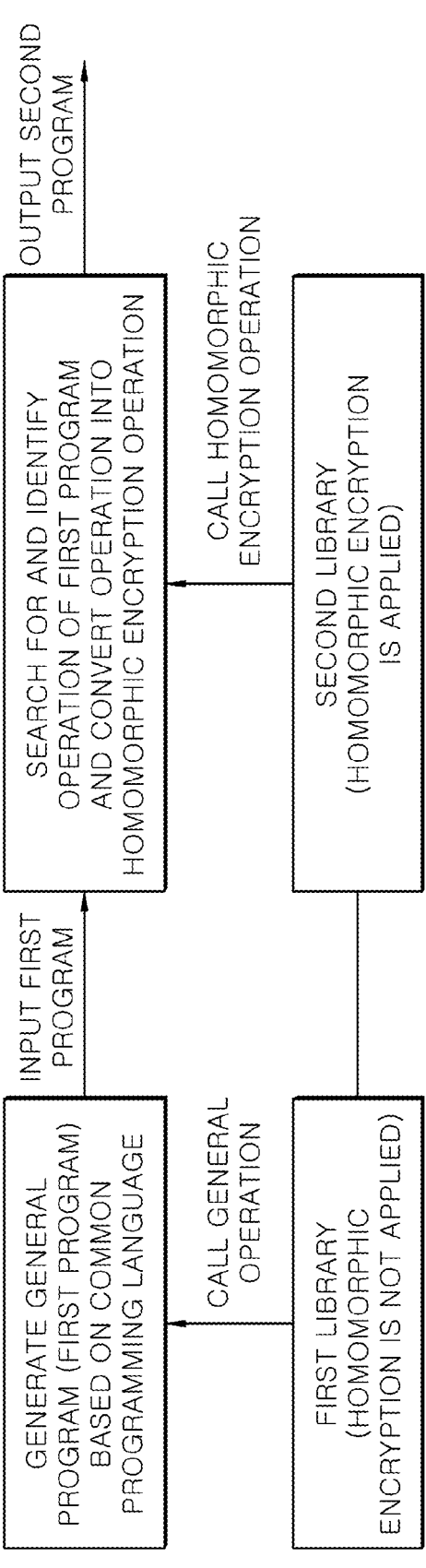
FIG. 2 is an exemplary diagram for generally describing a program conversion process according to the present embodiment.

FIG. 1 is a block diagram illustrating a program conversion apparatus according to the present embodiment, FIG. 2 is an exemplary diagram for generally describing a program conversion process according to the present embodiment, and FIG. 3 is an exemplary diagram illustrating a structure of a variance operation algorithm of a second library in the program conversion apparatus according to the present embodiment.

As shown in FIG. 1, the program conversion apparatus of the present embodiment may include a memory 100 and a processor 200.

Before detailed description of the present embodiment, the terms used in the present specification will be first defined. In the present embodiment, a general program to which homomorphic encryption is not applied is defined as a first program, and a program to which homomorphic encryption is applied (i.e., a homomorphic encryption program) is defined as a second program.

With respect to libraries required to configure (implement) the general program (i.e., the first program) and the homomorphic encryption program (i.e., the second program), a library for configuring the first program is defined as a first library, and a library for configuring the second program is defined as a second library. The first and second libraries may be stored in the memory 100, and at least one instruction executed by the processor 200, which will be described below, may be stored in the memory 100. The memory 100 may be implemented as a volatile storage medium and/or a non-volatile storage medium, for example, as a read only memory (ROM) and/or a random access memory (RAM).

The first program can be implemented by a general programmer (i.e., without understanding of homomorphic encryption) through a general programming language such as C/C++, Phython, or R. When the first program is implemented through the C/C++ language, the first library may include an Rccp library for data operations and descriptive statistical operations, and a boost:math library and a Dlib library for advanced statistical operations and hypothesis testing operations. When the first program is implemented through the Phython language, the first library may include a Pandas library for preprocessing operations and descriptive statistical operations, a Scipy library for descriptive statistical operations and statistical analysis operations, and a Scikit-learn library for hypothesis testing operations and advanced statistical operations. When the first program is implemented through the R language, the first library may include a dplyr library and a tidyverse library for preprocessing operations, a stats library for descriptive statistical operations, a caret library for advanced statistical operations, and a tidymodels library for hypothesis testing operations. In addition, an artificial intelligence (AI) framework for AI operations, such as Pythorch and Tensorflow, may be included in the first library. That is, one or more operations to which homomorphic encryption is not applied are defined in the first library. The operations defined in the first library to which homomorphic encryption is not applied are expressed as general operations.

The second library provides operations for implementing the second program, that is, one or more operations to which homomorphic encryption is applied are defined in the second library. The operations to which homomorphic encryption is applied and which are defined in the second library, are expressed as homomorphic encryption operations. The second library may include an HEAAN library, a SEAL library, and a PALISADE (OpenFHE) library, which are implemented as software libraries and made public to provide homomorphic encryption operation algorithms, as its sub-libraries.

The processor 200 is the main entity that performs the program conversion operation of the present embodiment, may be implemented as a central processing unit (CPU) or a system on chip (SoC), may run an operating system or an application to control a plurality of hardware or software components connected to the processor 200, and may perform various types of data processing and various operations. The processor 200 may execute at least one instruction stored in the memory 100 and store the execution result data in the memory 100.

FIG. 2 generally shows a program conversion process according to the present embodiment, and the program conversion process employed in the present embodiment will be generally described with reference to the above-described content and FIG. 2.

First, the first program is implemented (written) by a general programmer. An application program interface (API) of a specific operation provided by the first library is called by a processor (which may correspond to the processor 200 that is the main entity implementing the second program, which will be described below or may correspond to a separate processor implemented independently from the processor 200) so that the first program may be implemented in such a way that the above-described specific operation is reflected in the first program. In an example in which the first program is implemented through the C++ language, in order to reflect a descriptive statistical operation written by the general programmer in the first program, the processor may call an API of the descriptive statistical operation provided by the Rccp library to reflect the corresponding descriptive statistical operation in the first program. That is, the first program corresponds to a general program implemented using a programming language with which the general programmer is familiar.

Meanwhile, a plurality of general operations may be reflected (written) in the first program. Considering that not all general operations in the first program need to be converted to homomorphic encryption operations, among the general operations of the first program, operations required to be converted into homomorphic encryption operations may be tagged with decorators (the tagging of the decorators may be performed by the general programmer when the first program is implemented). The processor, which will be described below, performs conversion to homomorphic encryption operations only on the operations tagged with decorators among the general operations of the first program.

When the first program is implemented based on the first library, the processor 200 receives the first program and converts the first program into the second program based on the second library stored in the memory 100. That is, the processor 200 converts the first program into the second program through conversion between the operations provided by the first and second libraries. More specifically, as shown in FIG. 2, the processor 200 converts the operation reflected in the first program into the homomorphic encryption operation by searching for and identifying an operation, which is reflected in the first program and provided by the first library, and calling a homomorphic encryption operation corresponding to the identified operation from the second library. The processor 200 generates the second program (that is, converts the first program into the second program) based on the converted homomorphic encryption operation, Based on the above-described contents, the program conversion process of the present embodiment will be described in detail below, focusing on the operation of the processor 200.

The processor 200 may convert the first program into the second program through conversion from one or more general operations provided by the first library into one or more homomorphic encryption operations provided by the second library. That is, the processor 200 may convert the first program into the second program by identifying the first operation applied to the first program among the one or more general operations provided by the first library and calling the second operation corresponding to the identified first operation among the one or more homomorphic encryption operations provided by the second library. The first operation is an operation that is a target to be converted into the second operation, which is the homomorphic encryption operation, and thus the processor 200 may specify the operation tagged with the above-described decorator among the general operations of the first program as the first operation, which becomes a target to be converted.

As a way to identify the second operation corresponding to the first operation in the second library, the present embodiment employs a configuration in which one or more general operations defined in the first library and one or more homomorphic encryption operations defined in the second library have a linked relationship according to a type of operation (i.e., a function of the operation). As a specific example, an API for calling a variance operation (var( ) defined in the first library (hereinafter, an API for calling a general operation is referred to as a first API) and an API for calling a variance operation defined in the second library (hereinafter, an API for calling a homomorphic encryption operation is referred to as a second API) may be linked to each other. Based on the above linked relationship, the processor 200 may convert the first program into the second program by identifying the first operation applied to the first program, calling the second operation linked to the identified first operation, and then reflecting the called second operation in the second program.

In an example of the variance operation, the processor 200 may convert the first program into the second program by identifying the variance operation (corresponding to a general operation) reflected in the first program, calling the variance operation (corresponding to a homomorphic encryption operation) defined in the second library by calling the second API linked to the first API for calling the identified variance operation, and reflecting the called variance operation in the second program. FIG. 3 shows a structure of the variance operation algorithm of the second library, which becomes a call target for generating the second program. The variance operation algorithm may include a plurality of primitive operators provided by homomorphic encryption libraries such as an HEAAN library, a SEAL library, and a PALISADE (OpenFHE) library, which are publicly available, a sub-operator consisting of a combination of one or more primitive operators, and a main operator consisting of a combination of one or more primitive operators or a combination of one or more sub-operators. The structure of the calculation algorithm including the primitive operator, the sub-operator, and the main operator is the same as other operations applied to the second library.

Meanwhile, the processor 200 may convert the first program into the second program by performing a process of calling the second operation linked to the first operation for each operation tagged with the decorator, which is applied to the first program.

As a specific example, when an average operation (avg( )) and the variance operation (var( )) are reflected in the first program and each operation is tagged with the decorator, the processor 200 calls an average operation (corresponding to a homomorphic encryption operation) defined in the second library by identifying an average operation (corresponding to a general operation) reflected in the first program and calling the second API linked to the first API for calling the identified average operation. Subsequently, the processor 200 calls the variance operation (corresponding to a homomorphic encryption operation) defined in the second library by identifying the variance operation (corresponding to a general operation) reflected in the first program and calling the second API linked to the first API for calling the identified variance operation. Finally, the processor 200 generates the second program based on the average operation and the variance operation (corresponding to the homomorphic encryption operation) called through the second API.

Figure 4:
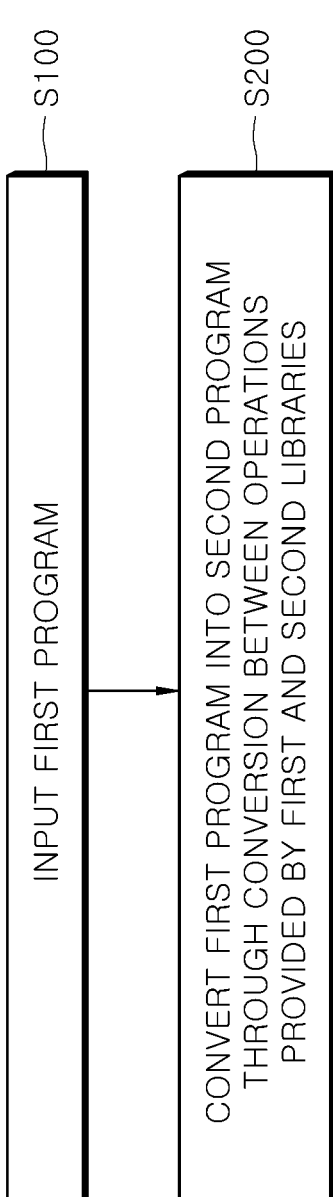
FIG. 4 is a flowchart illustrating a program conversion method according to the present embodiment.

FIG. 4 is a flowchart illustrating a program conversion method according to the present embodiment. The program conversion method of the present embodiment will be described with reference to FIG. 4, and a detailed description of parts overlapping the above-described content will be omitted and description will be made by focusing on the time-series structure.

First, the processor 200 receives the first program (S100). The first program corresponds to a general program, which is implemented based on the first library and to which homomorphic encryption is not applied.

Then, the processor 200 converts the first program into the second program through conversion between the operations provided by the first and second libraries (S200). The second program corresponds to a homomorphic encryption program, which is implemented based on the second library and to which homomorphic encryption is applied.

In operation S200, the processor 200 converts the first program into the second program through conversion from one or more general operations provided by the first library into one or more homomorphic encryption operations provided by the second library. Specifically, the processor 200 converts the first program into the second program by identifying a first operation applied to the first program among the one or more general operations provided by the first library and calling a second operation corresponding to the identified first operation among the one or more homomorphic encryption operations provided by the second library. In this case, the processor 200 may specify an operation tagged with a decorator among the general operations of the first program as a first operation, which becomes a target to be converted.

Meanwhile, the one or more general operations defined in the first library and the one or more homomorphic encryption operations defined in the second library are configured to have a linked relationship according to a type of operation, and in operation S200, based on the linked relationship, the processor 200 converts the first program into the second program by calling the second operation linked to the first operation.

In addition, in operation S200, the processor 200 converts the first program into the second program by performing a process of calling the second operation linked to the first operation for each operation applied to the first program.

Meanwhile, the program conversion method according to the present embodiment may be combined with hardware and written as a computer program executing operations S100 and S200 and may be stored in a computer-readable recording medium to be implemented in a general-purpose digital computer executing the computer program. Examples of the computer-readable recording media may include a read only memory (ROM), a random access memory (RAM), magnetic media such as a hard disk drive (HDD), a floppy disk, and a magnetic tape, optical recording media such as a compact disc ROM (CD-ROM) and a digital versatile disc (DVD), a magneto-optical medium such as a floptical disk, and a hardware device specifically configured to store and execute program instructions, such as a flash memory.

As described above, according to the present invention, without first understanding of the homomorphic encryption operation algorithm, which is difficult to understand, a general program can be programmed by using general-purpose programming languages and libraries such as general statistics/AI that are familiar to general programmers so that it is possible to implement the homomorphic encryption program through the conversion apparatus and method according to the present invention, and thus the convenience and ease of implementing the homomorphic encryption program can be improved.

Implementations described herein may also be implemented by, for example, a method or process, an apparatus, a software program, a data stream, or a signal. Even when only discussed in the context in a single form of implementation (e.g., discussed only as a method), the implementation of discussed features may also be implemented in other forms (e.g., an apparatus or program). The apparatus may be implemented with suitable hardware, software, and firmware. The method may be implemented in an apparatus such as a processor, which is generally referred to as a processing device including, for example, a computer, a microprocessor, an integrated circuit, or a programmable logic device. The processor also includes communication devices such as computers, cellular phones, portable/personal digital assistants ("PDAs"), and other devices that facilitate information communication between end-users.

While the present invention has been described with reference to the embodiments shown in the drawings, these embodiments are merely illustrative and it should be understood that various modifications and other equivalent embodiments can be derived by those skilled in the art on the basis of the embodiments. Therefore, the technical scope of the present invention should be defined by the appended claims.

What is claimed is:

1. A program conversion apparatus, which converts a first program to which homomorphic encryption is not applied into a second program to which the homomorphic encryption is applied, the program conversion apparatus comprising:

a memory, which stores a first library for configuring the first program and a second library for configuring the second program; and a processor configured to convert the first program into the second program through conversion between operations provided by the first and second libraries, and to output the second program, wherein one or more general operations to which homomorphic encryption is not applied are defined in the first library, and one or more homomorphic encryption operations to which homomorphic encryption is applied are defined in the second library, and the processor converts the first program into the second program through conversion from the one or more general operations provided by the first library into the one or more homomorphic encryption operations provided by the second library, and the processor converts the first program into the second program by identifying a first operation applied to the first program among the one or more general operations provided by the first library and calling a second operation corresponding to the identified first operation among the one or more homomorphic encryption operations provided by the second library.

2. The program conversion apparatus of claim 1, wherein:

among the general operations of the first program, an operation, which is required to be converted into the second operation, is tagged with a decorator; and the processor specifies the operation tagged with the decorator among the general operations of the first program as the first operation.

3. The program conversion apparatus of claim 1, wherein the one or more general operations defined in the first library and the one or more homomorphic encryption operations defined in the second library have a linked relationship according to a type of operation.

4. The program conversion apparatus of claim 3, wherein the processor converts the first program into the second program by calling the second operation linked to the first operation based on the linked relationship.

5. The program conversion apparatus of claim 1, wherein the processor converts the first program into the second program by performing a process of calling the second operation linked to the first operation for each operation applied to the first program.

6. A program conversion method, which converts a first program to which homomorphic encryption is not applied into a second program to which the homomorphic encryption is applied, the program conversion method comprising:

receiving, by a processor, the first program;

converting, by the processor, the first program into the second program through conversion between operations provided by first and second libraries, the first and second libraries being libraries for configuring the first and second programs, respectively; and outputting, by the processor, the second program, wherein one or more general operations to which homomorphic encryption is not applied are defined in the first library, and one or more homomorphic encryption operations to which homomorphic encryption is applied are defined in the second library, in the converting, the processor converts the first program into the second program through conversion from the one or more general operations provided by the first library into the one or more homomorphic encryption operations provided by the second library, and in the converting, the processor converts the first program into the second program by identifying a first operation applied to the first program among the one or more general operations provided by the first library and calling a second operation corresponding to the identified first operation among the one or more homomorphic encryption operations provided by the second library.

7. The program conversion method of claim 6, wherein:

among the general operations of the first program, an operation, which is required to be converted into the second operation, is tagged with a decorator; and in the converting, the processor specifies the operation tagged with the decorator among the general operations of the first program as the first operation.

8. The program conversion method of claim 7, wherein, in the converting, the processor converts the first program into the second program by calling the second operation linked to the first operation based on the linked relationship.

9. The program conversion method of claim 7, wherein, in the converting, the processor converts the first program into the second program by performing a process of calling the second operation linked to the first operation for each operation applied to the first program.

10. The program conversion method of claim 6, wherein the one or more general operations defined in the first library and the one or more homomorphic encryption operations defined in the second library have a linked relationship according to a type of operation.

11. A computer program recorded on a non-transitory computer-readable storage medium, which is combined with hardware and converts a first program to which homomorphic encryption is not applied into a second program to which homomorphic encryption is applied, the computer program comprising instructions for:

receiving the first program;

converting the first program into the second program through conversion between operations provided by first and second libraries, the first and second libraries being libraries for configuring the first and second programs, respectively; and outputting the second program, wherein one or more general operations to which homomorphic encryption is not applied are defined in the first library, and one or more homomorphic encryption operations to which homomorphic encryption is applied are defined in the second library, in the converting, the processor converts the first program into the second program through conversion from the one or more general operations provided by the first library into the one or more homomorphic encryption operations provided by the second library, and in the converting, the processor converts the first program into the second program by identifying a first operation applied to the first program among the one or more general operations provided by the first library and calling a second operation corresponding to the identified first operation among the one or more homomorphic encryption operations provided by the second library.

* * * * *